UNITED STATES PATENT OFFICE.

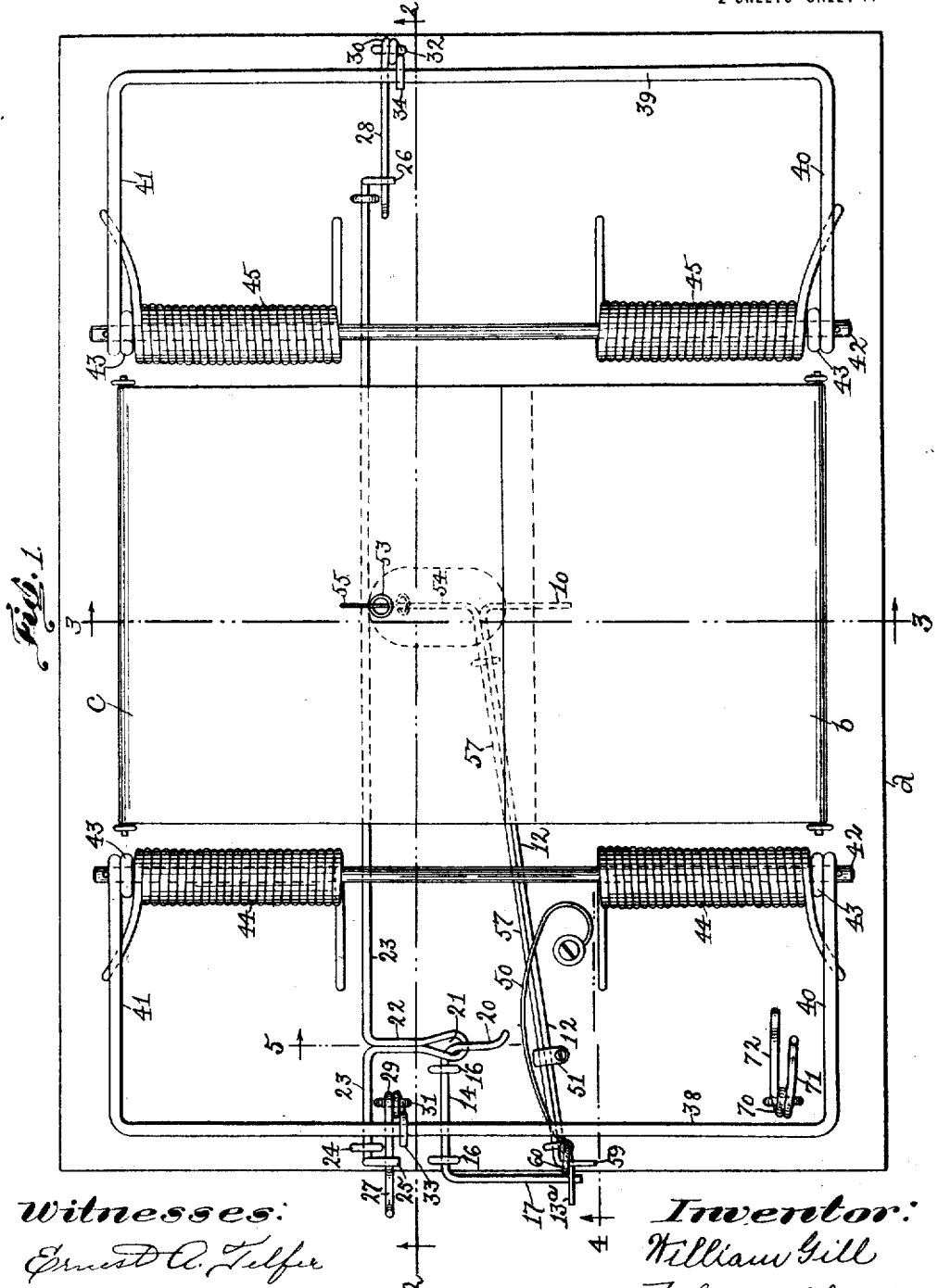

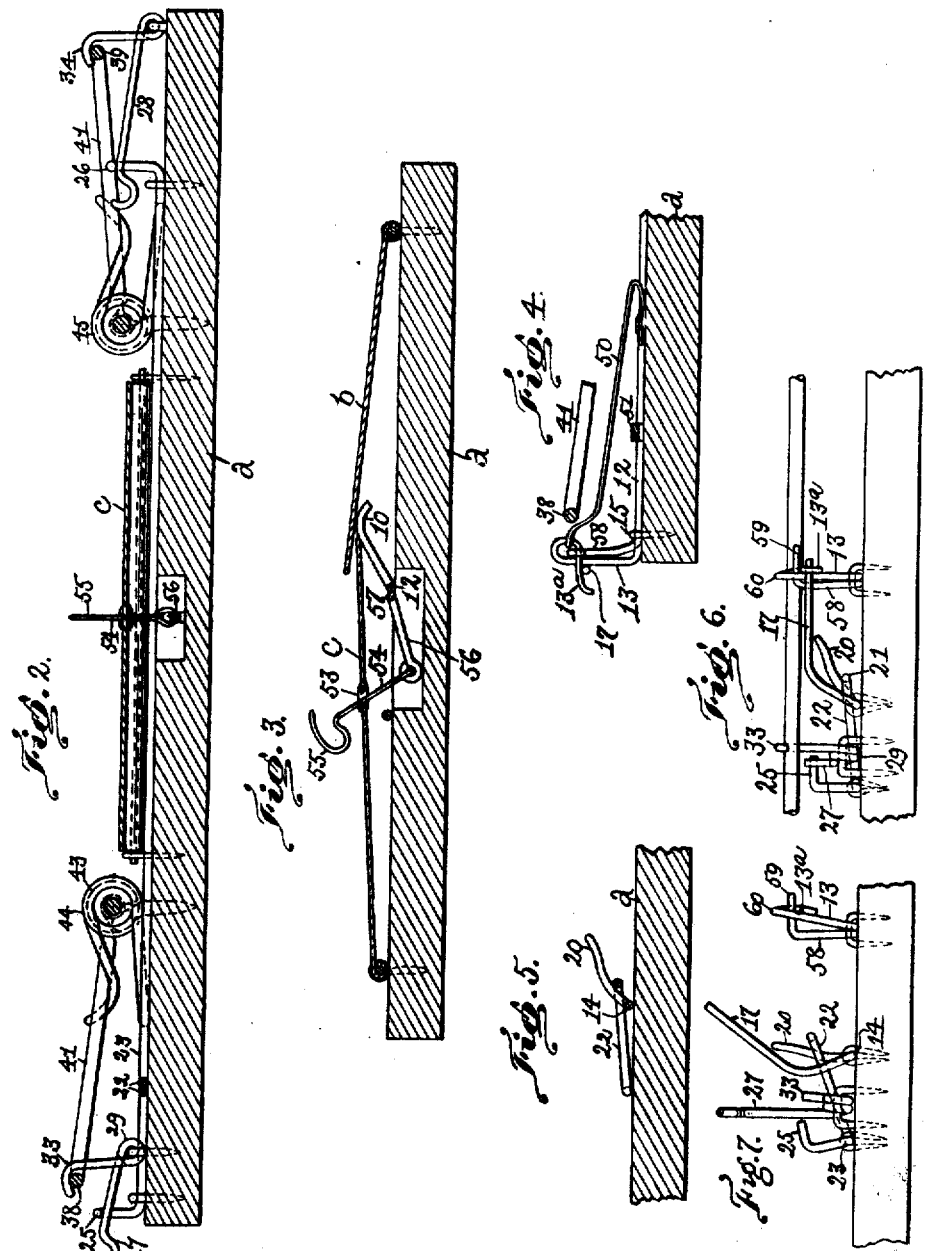

WILLIAM GILL, OF BOSTON, MASSACHUSETTS.

RAT-TRAP.

1,211,134.  Specification of Letters Patent.  Patented Jan. 2, 1917.

Application filed November 5, 1914. Serial No. 870,532.

*To all whom it may concern:*

Be it known that I, WILLIAM GILL, a citizen of the United States, residing in Boston, in the county of Suffolk and State of Massachusetts, have invented an Improvement in Rat-Traps, of which the following description, in connection with the accompanying drawings, is a specification, like characters on the drawings representing like parts.

This invention relates to a trap for catching rats or other animals, and has for its object to provide a simple, inexpensive and highly efficient trap which can be used effectively with or without a bait, and which is constructed to be operated by the weight of the animal or by the latter taking the bait. Provision is made for overcoming the suspicious nature of the rat or other animal. Provision is also made for operating two spring actuated jaws simultaneously, which jaws are located on opposite sides of a runway when the trap is set. Provision is also made for baiting the trap. These and other features of this invention will be pointed out in the claims at the end of this specification.

Figure 1 is a plan view of a rat trap embodying this invention. Fig. 2, a section on the line 2—2, Fig. 1. Fig. 3, a section on the line 3—3, Fig. 1. Fig. 4, a section on the line 4—4, Fig. 1. Fig. 5, a section on the line 5—5, Fig. 1. Fig. 6, an end view looking toward the right in Fig. 1 and Fig. 7, an end view with the parts shown as released.

Referring to the drawings $a$ represents a base of wood, metal or other suitable material, which supports the operative parts of the trap, and in the present instance the base $a$ has pivoted to it the outer ends of two plates $b$, $c$, which are extended toward each other and toward the center of the base and overlap at their inner ends. The plates $b$, $c$, constitute members of a runway, and they are normally inclined downwardly, by having their inner ends raised by a crank or arm 10 on a rock shaft or rod 12, which is extended to near one end of the base $a$ and is provided with a crank or arm 13 having an extension or finger $13^a$, see Figs. 1 and 4, which constitutes a latch or holding device for a second rock shaft 14. The rod 12 is secured to the base as by staples 15 or otherwise, so as to rock or turn on said base.

The rock shaft 14 is secured to the base $a$ so as to rock thereon by staples 16 or otherwise, see Fig. 1, and is provided with a crank 17, which is designed to extend under the finger $13^a$, so as to hold the shaft 14 from turning, and the rock shaft 14 is provided with a second crank or arm 20, which is extended through an eye or loop 21 in a crank or arm 22 of a rock shaft 23, which is secured to the base so as to rock thereon, by staples 24 or otherwise.

The rock shaft 23 in the present instance is extended under the runway member $c$ and is provided at its opposite ends with cranks or arms 25, 26, which coöperate with the long arms 27, 28, of two levers 29, 30, which are pivoted to the base $a$ by staples 31, 32, or otherwise, and are provided with shorter arms 33, 34, which are bent at their ends to engage two spring actuated jaws or catching members, 38, 39, and hold them in their inoperative position.

Each of the jaws 38, 39, may be made as herein shown and consists of a wire rod, which is bent into the form of a yoke, having arms 40, 41, which are mounted to turn on a pivot rod 42, supported above the base $a$ by screw eyes 43 or otherwise.

The jaw 38 is turned on its pivot rod 42 by coiled springs 44, which encircle the said rod near the opposite ends of the same, each coil having one end fastened to the base $a$ and the other end extended under an arm of the jaw, as shown in Fig. 1.

The jaw 39 is turned on its pivot rod 42 by similar springs 45.

The apparatus as thus far described is operative without any bait, and when the trap is set, the operative parts are in the position shown in Figs. 1 to 5, in which position it will be seen, that the jaws 38, 39, are turned away from the runway and are held substantially parallel with and in close proximity to the base $a$ by the catches or levers 29, 30, whose arms 33, 34, are extended over the cross bars of the jaws and whose long arms 27, 28, are held down by the cranks or arms 25, 26, on the rock shaft 23, which in turn is held from movement by the crank 20 on the rock shaft 14 bearing down on the end wall of the eye 21 in the crank 22 of the rock shaft 23. The rock shaft 14 is held from turning by the finger or arm $13^a$ on the rock shaft 12 projecting over the arm 17 on the rock shaft 14, and the rock shaft 12 is held in its operative position against the weight of the runway members on the crank 10, by a spring 50, which has one and secured to the base *a* and the other end engaged with the arm 13 of the rock shaft. The spring 50 may be assisted in holding the rock shaft 12 stationary by a friction piece or bar 51, which is secured to the base and engages the rock shaft 12.

To spring the trap, it is only necessary for the rat to walk upon either of the runway members *b*, *c*, for when the rat advances up either runway member, the weight thus placed upon said member depresses the crank 10 and rocks the shaft 12, which carries the finger 13ᵃ off from the end of the crank 17 on the rock shaft 14, thereby releasing the jaws which are no longer locked but are free to be turned by the springs 44, 45 over upon the runway and the rat thereon, the force of the blow being designed to be sufficient to kill the rat.

When the shaft 12 is rocked by the weight of the rat, the crank 13 is moved from the position shown in Fig. 6 to that shown in Fig. 7, and the rock shaft 14 and lever 29 and rock shaft 23, are moved by the springs 44 into substantially the positions shown in Fig. 7.

Provision is also made for baiting the trap and for operating the trap by the rat seizing the bait. To this end one of the runway members as *c* is provided with an opening 53, through which the shank 54 of a hook 55 is passed and connected with a crank or arm 56 on a rock shaft 57 secured to the base *a* to rock thereon and provided with a second crank 58 having a finger 59, see Fig. 6, extended through a loop 60 in the crank of the rock shaft 12. It will be seen that if the rat should grab the bait on the hook and pull upon the latter, the crank 56 will be elevated from the position shown in Fig. 3, and the shaft 57 will be rocked in such direction as to cause its crank 58 to move the crank 13 of the rock shaft 12 out of engagement with the crank 17 and thus spring the trap.

By reference to Fig. 1, it will be seen that the jaws of the trap are removed from the runway, and are substantially parallel with the base *a*, so that they leave the runway practically clear and do not create suspicion on the part of the rat. The jaws may also be concealed from view by a layer of bran, meal or the like. The trap can be located in front of the rat hole in the wall of a house, so that when the rat comes out it is obliged to step upon the runway and thus spring the trap.

It is desirable to reduce the cost of construction, and for this purpose, the parts of the trap may be made of wire, as illustrated Provision may and preferably will be made for locking the jaws against movement, while the parts are being placed in operative position, and thus avoid injury by premature springing of the trap. To this end, the base has pivoted to it a lever 70, see Fig. 1, having an arm 71 provided with a bent end to hook over the cross rod of the jaw 38, and said lever may and preferably will have a longer arm 72, which is arranged with respect to the arm 71, so as to assume a vertical position when the arm 71 is engaged with the jaw 38, and thus serve as an indicator to the person setting the trap that the jaws are locked against closing movement and that the catches may be set without danger of springing the trap. After the trap has been set, the locking lever 70 may be disengaged from the jaw 38 and allowed to assume a horizontal position on the base *a*. It is preferred to provide the trap with two jaws located on opposite sides of the runway, but it is not desired to limit the invention in this respect, as a single jaw can be used.

To facilitate the easy setting of the trap, the levers 29, 30, are pivoted in such manner that they can be turned in a vertical plane to engage the arms 33, 34, with the cross bar of the jaws 38, 39, and also are capable of being moved laterally or in a horizontal plane to carry the long arms 27, 28, under the cranks 25, 26, of the rock shaft, after the hooks or arms 33, 34, have been engaged with the jaws.

I claim:

1. In an animal trap, in combination, a base, runways pivoted at their remote ends to said base and having their free ends extended toward each other and overlapping, a spring-actuated jaw pivoted to said base substantially at right angles to the pivots for said runways and capable of being turned over upon said runways to extend lengthwise thereof on opposite sides of their overlapping ends, a rock-shaft extended under said jaw and said runways and provided with a crank which supports the free ends of said runways, and means for operatively connecting the spring-actuated jaw in its open position with the end of the rock-shaft which extends under said jaw.

2. In an animal trap, in combination, a base, a runway pivoted to said base and provided with an opening through it, a rock-shaft located below said runway, a bait hook extended from above the runway through the opening therein and connected with said rock-shaft, a spring-actuated jaw pivoted to said base substantially at right angles to the pivot for said runway and capable of being turned over upon the runway to extend lengthwise thereof and substantially at right angles to the pivot of said runway, said rock-shaft having its outer end extended under the spring-actuated jaw, and means for operatively connecting the spring-actuated jaw in its open position with the end of the rock-shaft which extends under said jaw.

3. In an animal trap, in combination, a base, a runway pivoted at one end to said base, a crank located below said runway and supporting the free end of the latter in a position above said pivot to incline the runway upward from its pivot toward its free end, a rock-shaft extended laterally beyond said runway and to which said crank is attached, a spring-actuated jaw pivoted to said base substantially at right angles to the pivot of said runway to cause the said jaw to be moved over upon the runway from one side thereof and to extend lengthwise of said runway and substantially at right angles to the pivot of said runway, and means for operatively connecting the said jaw with the end of the rock-shaft which projects beyond the side of the said runway.

4. In an animal trap, in combination, a runway pivoted at one end to said base, a crank located below said runway and supporting the free end of the latter in a position above said pivot to incline the runway upward from its pivot toward its free end, a rock-shaft extended laterally beyond said runway and to which said crank is attached, spring-actuated jaws pivoted to said base on opposite sides of said runway and substantially at right angles to the pivot of said runway to cause the said jaws to be moved over upon the runway from the opposite sides thereof and substantially at right angles to the pivot of said runway, means extended under one end of said runway and coöperating with said jaws to hold the latter in their open position, and operatively connected with said rock-shaft to be actuated by the latter to release said jaws and permit them to be moved toward each other and over upon the said runway.

In testimony whereof, I have signed my name to this specification in the presence of two subscribing witnesses.

WILLIAM GILL.

Witnesses:
JAS. H. CHURCHILL,
J. MURPHY.

Copies of this patent may be obtained for five cents each, by addressing the "Commissioner of Patents, Washington, D. C."